Feb. 14, 1939.    J. C. STEVENS    2,146,999
SIGNALING APPARATUS AND SYSTEM
Filed March 7, 1936    4 Sheets-Sheet 1
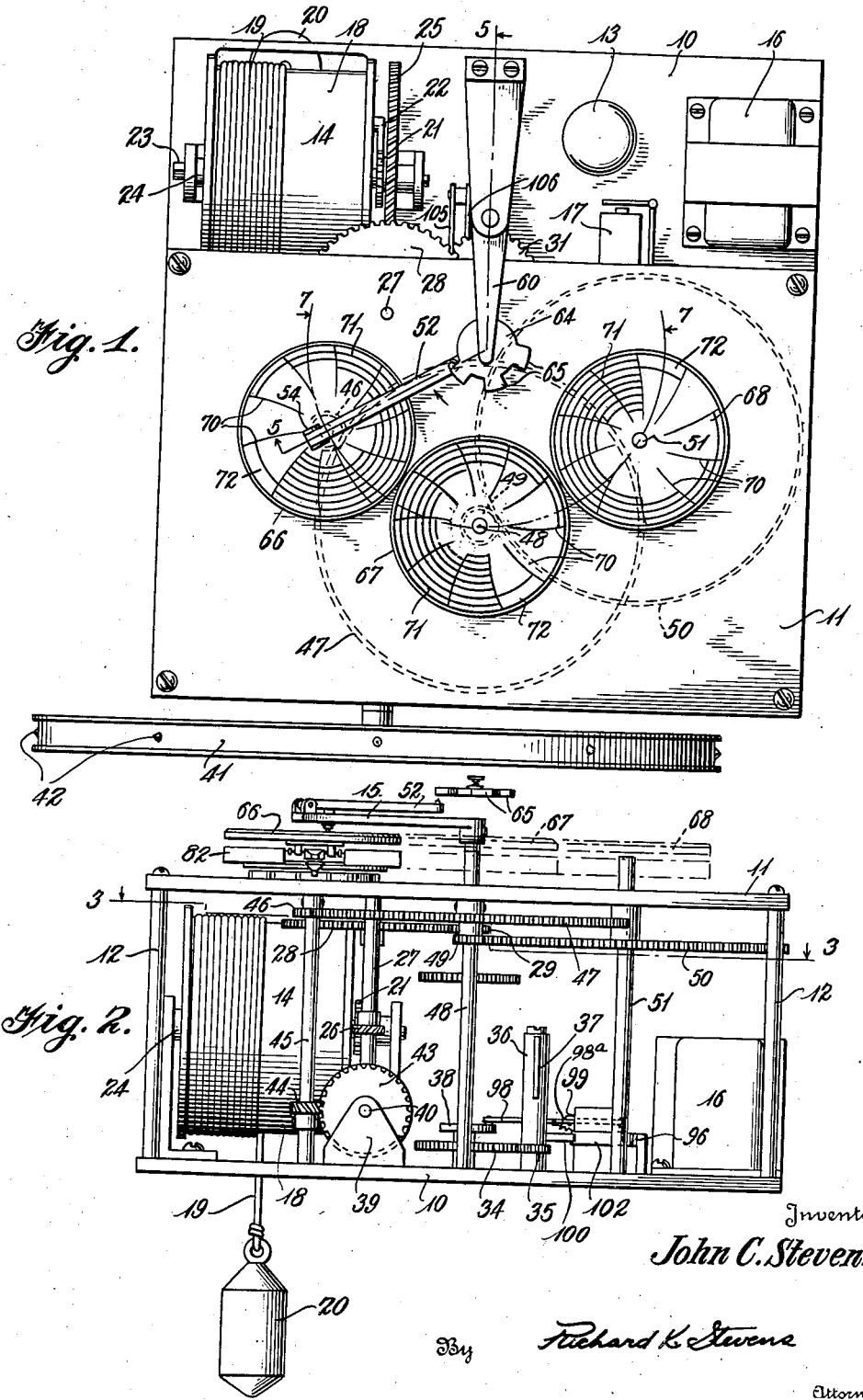
Inventor
John C. Stevens
By Richard K. Stevens
Attorney Feb. 14, 1939.　　　　J. C. STEVENS　　　　2,146,999
SIGNALING APPARATUS AND SYSTEM
Filed March 7, 1936　　　　4 Sheets-Sheet 2
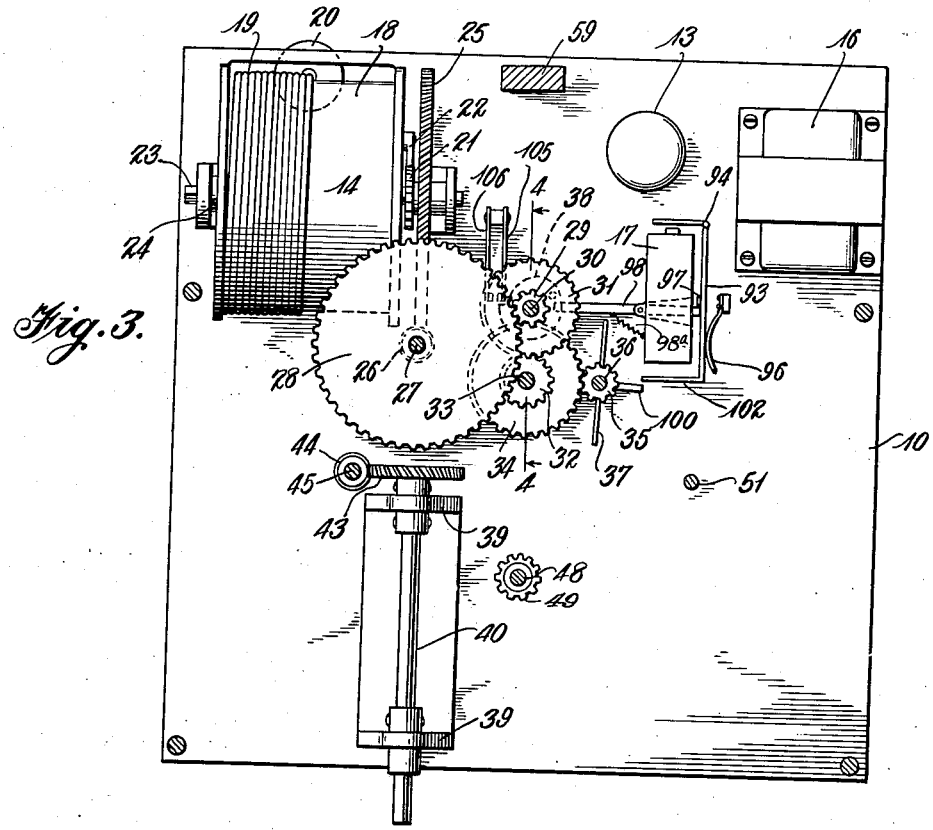
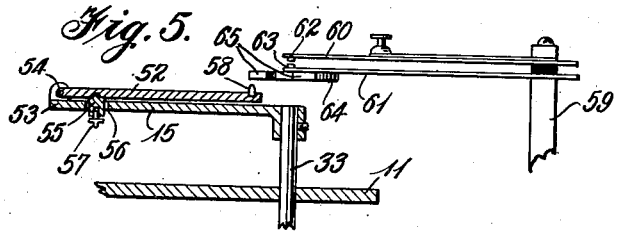
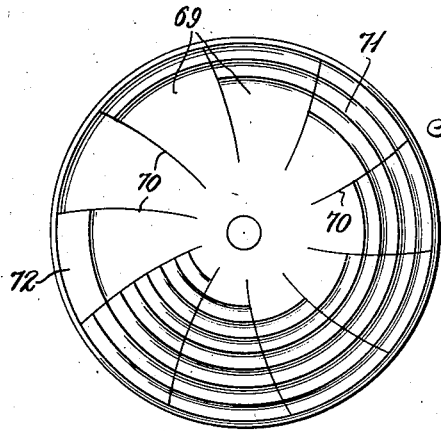
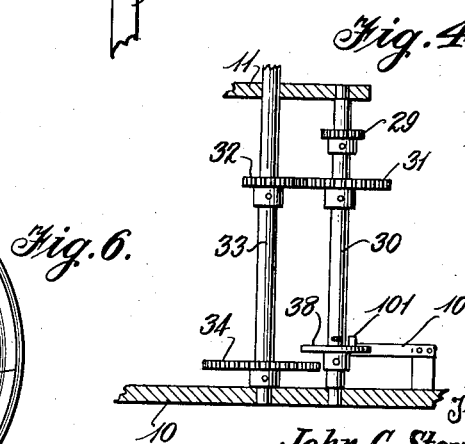
Inventor
John C. Stevens
By Richard K. Stevens
Attorney Feb. 14, 1939. J. C. STEVENS 2,146,999
SIGNALING APPARATUS AND SYSTEM
Filed March 7, 1936 4 Sheets-Sheet 3
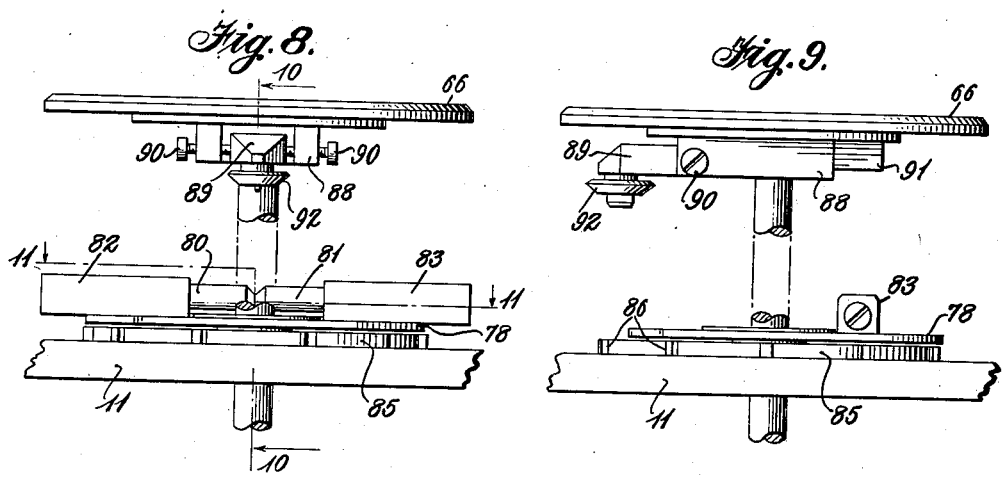
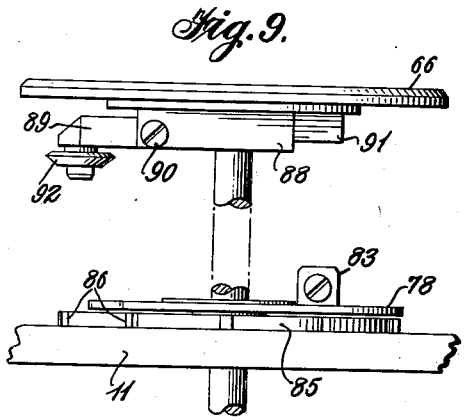
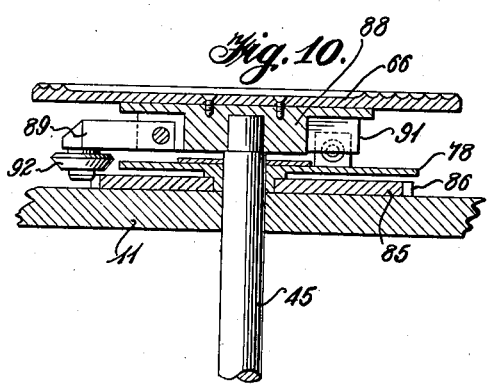
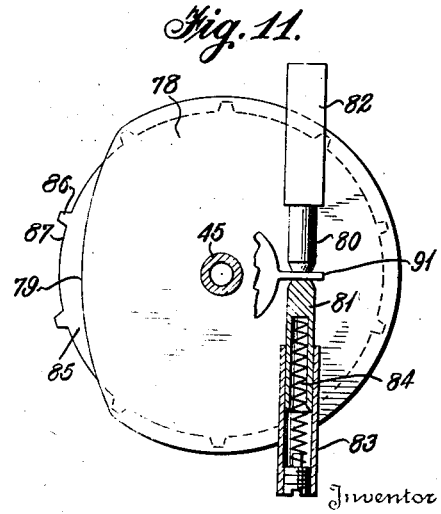
Inventor
John C. Stevens
By Richard K. Stevens
Attorney Feb. 14, 1939.  J. C. STEVENS  2,146,999
SIGNALING APPARATUS AND SYSTEM
Filed March 7, 1936   4 Sheets-Sheet 4
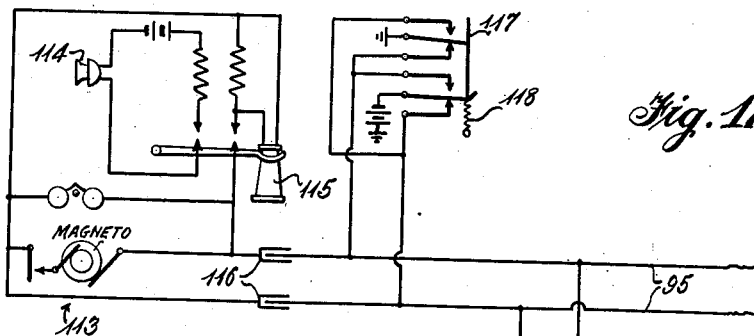
Fig. 12.
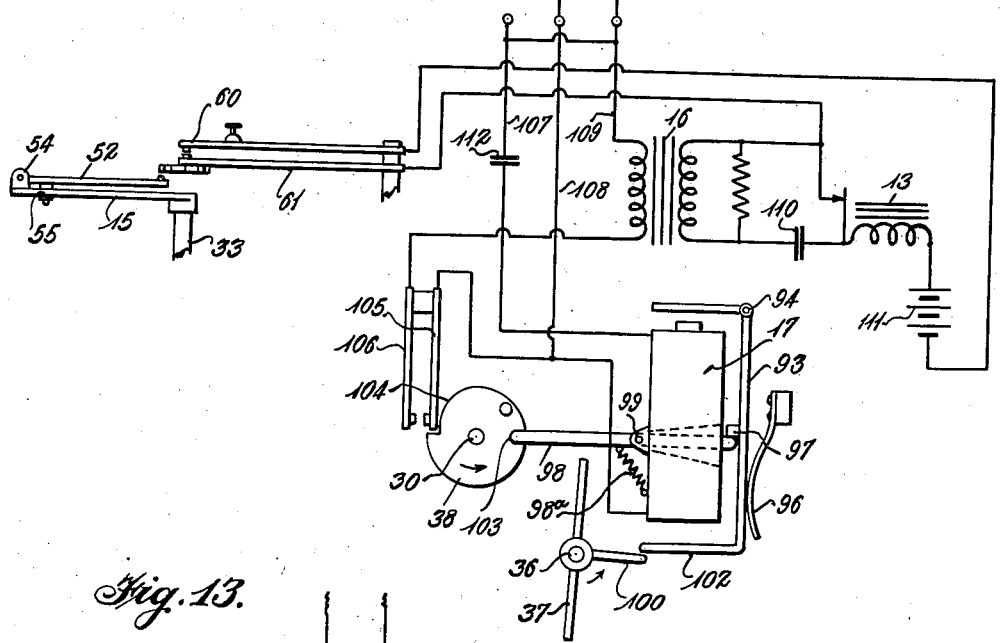
Fig. 13.
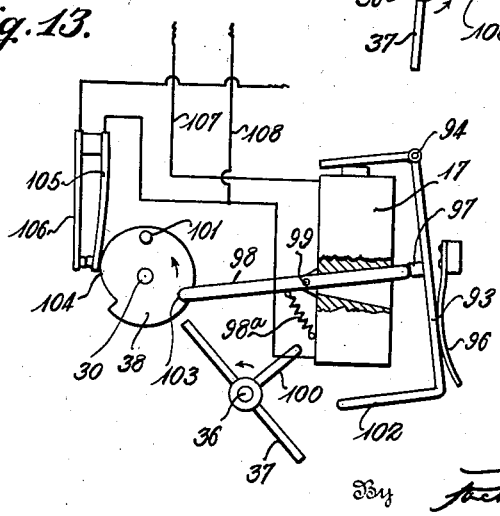
Inventor
John C. Stevens
By Richard K. Stevens
Attorney Patented Feb. 14, 1939

2,146,999

UNITED STATES PATENT OFFICE 2,146,999

SIGNALING APPARATUS AND SYSTEM

John C. Stevens, Portland, Oreg., assignor to Leupold, Volpel and Company, Portland, Oreg., a corporation of Oregon Application March 7, 1936, Serial No. 67,709

14 Claims. (Cl. 177—351)

This invention relates to an electric system for transmitting information to a distant point, and more particularly to an apparatus for producing and transmitting signals representing the varying levels of a liquid or the changing position of gates, valves, gas tanks, or other movable objects.

In using streams, lakes, reservoirs and other water systems for power, irrigation or navigation, and particularly in controlling floods, it is essential to be able to rapidly obtain information as to the water levels existing simultaneously at various points in the system. During floods, for example, it is possible to save considerable life and property, if river heights can be ascertained in advance at a central dispatching office by means of gage stations located throughout the entire water shed. Information obtained quickly in this manner not only permits adequate preparations to be made before the flood has progressed to the danger point, but is also useful generally in observing and controlling the variable flow and depth of water at widespread points in a water system covering large territories.

It is also of great value to be able to determine from a central station the exact position of a water gate or valve, so that the quantity of liquid passing therethrough may be ascertained quickly and conveniently, and constant and accurate control over a large number of such mechanisms may be exercised with ease.

It is accordingly an object of the present invention to provide an apparatus which is adapted to produce signals representing the level of a liquid or the position of an object, and which is associated with a communicative system capable of starting the apparatus and transmitting the signals produced thereby. A further object of the invention is to provide a system enabling an operator located at a central station to obtain information of the kind referred to from a large number of measuring or gage stations in rapid succession thereby permitting an accurate survey of conditions over a large area at any desired time; and a still further object of the invention is to provide an apparatus of the nature referred to which is capable of measuring and indicating liquid level and similar data with greater accuracy and fineness of reading than has heretofore been possible with similar devices.

The invention generally comprises an apparatus for producing and transmitting to a distant point information of the type referred to and comprising a signal producing mechanism and a make and break device which is actuated jointly by a motor and a float or other movable member. The motor is normally withheld from operation, but is adapted to be released for a predetermined length of time by means of a relay or similar device and at such times it cooperates with the float to produce signals which vary in accordance with the level of a liquid or height of an object above datum. The above apparatus is adapted to be associated with a communicative system, such as a telephone line, which not only serves to initiate the operation of the apparatus, but also constitutes the agency for transmitting the resulting signals to a distant point.

The invention will be more fully described below with respect to the measurement of liquid level, although it is to be understood that the invention has numerous other applications and may be employed generally for indicating or registering information and transmitting the same any desired distance. For a more complete understanding thereof reference is made to the accompanying drawings in which like numerals refer to like parts.

In the drawings,

Figure 1 represents a plan view of the apparatus for producing the varying signals and transmitting them over the communicative system;

Figure 2 is an elevation thereof with several parts omitted;

Figure 3 is a section substantially along the line 3—3 of Figure 2;

Figure 4 is a detailed sectional view on the line 4—4 of Figure 3;

Figure 5 is a detailed sectional view through line 5—5 of Figure 1;

Figure 6 is an enlarged view of the face of one of the dials;

Figure 7 is a developed section along the line 7—7 of Figure 1;

Figure 8 is an exploded front elevation of one of the dials and tripping mechanisms;

Figure 9 is a side elevation of the parts shown in Figure 8;

Figure 10 is a section on the line 10—10 of Figure 8 with the parts in normal position;

Figure 11 represents a plan view of the lower disc shown in Figure 8 and is shown partly in section along the line 11—11 of that figure; and Figure 12 is a diagram of the various circuits and control devices.

Figure 13 is a detailed view, partly in section, of the relay, stop member and locking arm and associated parts, showing the position assumed by the stop member and locking arm after the relay has been energized.

Referring to Figures 1, 2 and 3, 10 represents the base plate for supporting various parts of the apparatus, and 11 represents a top plate which is supported by spacer posts 12. Mounted on base 10 is a high frequency buzzer or other electrical sound producing device 13 and a motor generally indicated at 14 which is adapted to rotate or otherwise move an arm 15 serving to open and close the buzzer circuit. Also supported on the base 10 are the transformer 16 and the locking relay 17, the function and operation of which will be hereinafter explained.

Motor 14 comprises a drum 18 to which is fixed one end of a cable 19 wound therearound and serving to support the weight 20 constituting the source of motive power. Drum 18 is provided with the usual ratchet 21 and pawl 22 and may be wound up at the squared end 23 of its supporting shaft 24 by a suitable key or wrench to raise weight 20 at intervals, thereby giving a turning torque to a large helical gear 25 which meshes with a small helical gear 26 fixed to the vertical shaft 27. On shaft 27 is also fixed a large spur gear 28 (see Figure 3) which meshes with a small gear 29 on the vertical shaft 30 which in turn carries a large gear 31 meshing with a small gear 32 on the vertical shaft 33 serving to support arm 15 on its upper end. Shaft 33 also carries a large gear 34 meshing with a small gear 35 on the shaft 36 which supports a small two-bladed fan 37 constituting a governor.

Shaft 30 is made to rotate counterclockwise and shaft 33 clockwise, but it is to be understood that these shafts as well as any other rotating parts may be made to rotate in any desired direction without interfering with the essential features of the invention. Moreover, all the above described shafts with the exception of shaft 36 have bearings both in base 10 and top plate 11, and the gears supported thereon act as a gear train actuated by weight 20 and serving to rotate arm 15 and fan 37, as well as a cam 38 carried on shaft 30 which is adapted to open and close the signal transmitting circuit and restore certain parts to their normal position, as will be hereinafter explained.

Likewise supported on base 10 in suitable bearings 39 is an horizontal shaft 40 which extends out beyond base 10 and has fixed thereto a pulley 41 about which a tape or cable may be conducted to connect the pulley with a float and counterweight (not shown), the first of which imparts rotary motion to the pulley in accordance with water level changes. If desired, the tape or other connecting means may be perforated at spaced points to receive suitable prongs such as shown at 42 on the periphery of the pulley, thus preventing slippage. On the opposite end of shaft 40 is carried a helical gear 43 which meshes with the helical gear 44 on the vertical shaft 45. Shaft 45 in turn carries a small spur gear 46 which meshes with a large gear 47 fixed to the vertical shaft 48 which also carries a small gear 49 meshing with the large gear 50 on the vertical shaft 51.

The gear ratio between gears 46 and 47, as well as gears 49 and 50 is 1 to 10, so that for each revolution of shaft 45, shaft 48 rotates one-tenth of a revolution, while the shaft 51 rotates one-hundredth of a revolution. This system of gearing, which is ordinary continuous countergearing, may be extending indefinitely and is adapted to rotate a series of plates or dials, the function of which will be subsequently explained.

Arm 15 is mounted on the upper end of shaft 33 and has a lever arm 52 pivotally mounted on its outer end 53 for vertically swinging movement. On arm 52 adjacent the pivot 54 is a stud 55 which extends through an aperture 56 in arm 15 and is provided with a small disc roller 57 in its lower portion. Adjacent the opposite end of arm 52 is an upwardly projecting pin 58, the function of which is to cause electrical contacts to be made as arm 52 is moved about pivot 54. Thus, in an arrangement of this nature slight up and down movements of roller 57 are sufficient to move pin 58 into contact closing position.

On base 10 is a vertical standard 59 which supports a pair of insulated springs 60 and 61 having platinum points 62 and 63 constituting electrical contacts which, when brought together, are adapted to close the sound or other signal producing circuit. Fixed to the lower side of spring 61 adjacent its outer end is a disc 64 of Bakelite or other insulating material having a plurality of relatively wide teeth 65 in its periphery (Figure 1). As arm 15 revolves about shaft 33, pin 58 describes a small circle underneath disc 64, and when arm 52 is raised at such a position that pin 58 encounters a tooth 65 in disc 64, spring 61 flexes and creates a contact between points 62 and 63, thereby closing the circuit through the sounding device 13. No contact is made, however, when pin 58 encounters a notch or space between the teeth on disc 64.

The means for raising arm 52 and repeatedly causing contact between points 62 and 63 comprises a plurality of disks or dials 66, 67 and 68 which are mounted on the top ends of shafts 45, 48 and 51 respectively in such a manner that, as pulley 41 is turned, the dials turn continuously therewith except for a short interval in each one-tenth revolution of the dials during which each dial is held and then suddenly released to pass a critical position, as will be hereinafter described. The dials rotate in a plane parallel to and slightly below the plane of rotation of arm 15, and are divided on their top surfaces into ten curvilinear sectors 69 bounded by arcs 70, the radii of which are equal to the distance of disc roller 57 from its center of revolution, i. e. shaft 33. In each of sectors 69 with the exception of two is a series of relatively narrow concentric ridges 71 (Figure 6) which contact roller 57, as arm 15 rotates about the shaft 33, and serve to raise the roller and hence arm 52 and pin 58 into contact producing position. In the two remaining sectors, only one ridge is provided, one of which, represented at 72, is considerably wider than the remaining ridges and is adapted to produce a long contact as roller 57 passes thereover. This wide ridge causes a buzzer tone representing zero, while all the narrow ridges produce short tones each of which represents one unit of measurement. Each sector accordingly contains a different number of ridges or a single wide ridge, so that the number of contacts made at points 62 and 63, as well as the duration thereof, vary with the particular sector positioned by the float in the path of roller 57. Tones may thus be produced by the ridges on one dial representing anywhere from 0 to 9 units of measurement.

In the arrangement shown the ridges or raised portions are made continuous, so that the same ridge may extend around the dial in an arcuate manner to traverse any number of sectors from one to nine. The nearer the ridges are to the circumference of the dial, the greater is their extent. Thus the ridge nearest the outer edge of the dial passes over nine of the sectors, the next adjacent ridge passes over eight of the sectors, and the ridge closest to the center of the dial only extends the width of one sector. It will also be observed that dials 66 and 68 are provided with identical faces, while the face of dial 67 is of opposite hand. These details of construction are not absolutely essential to the effective operation of the apparatus, however, as the ridges may be discontinuous, and they may be arranged in any other fashion designed to accomplish the desired purposes. Moreover the dials may be identical in surface conformation, if desired, it being merely necessary to rearrange the gears rotating the dials, so that they all rotate in the same direction.

An explanation of the action of the dials follows, reference being made to Figures 1 and 7, the latter of which is a developed section along the line 7—7 of Figure 1: Assuming that arm 15 is caused to revolve while the dials are in the positions shown in these figures, the roller 57 first encounters the wide ridge 72 on dial 68, as the gearing is so arranged that arm 15 revolves clockwise. While passing over this ridge, arm 15 is positioned in line with one of the teeth 65 on plate 64, so that as roller 57 raises arm 52 a long contact will be made at points 62 and 63, thereby closing the sound producing circuit and causing a tone representing zero. On the opposite side of dial 68, the roller meets six ridges 73, but as arms 15 and 52 pass under a notch in plate 64 at this point in their rotation, no contact is made at points 62 and 63 and a pause ensues. The roller next encounters two ridges 74 on dial 67 and since arm 15 is passing under another tooth 65 on plate 64 at this time, two short tones are accordingly produced. After arm 15 traverses the center of dial 67 it passes under a notch in plate 64 with the result that no contacts are made as roller 57 rides over the six ridges 75. Another pause then ensues until the seven ridges 76 on dial 66 are encountered, at which time arm 15 passes under another tooth 65 and seven tones are produced by the oscillatory movement of arm 52 about the pivot 54. On the opposite side of dial 66 the three ridges 77 cause no contacts to be made as they are similarly located with respect to the plate 64 as ridges 73 and 75. A long pause then ensues until arm 15 again passes over ridge 72 on dial 68.

Pulley 41 is preferably geared to dial 66 in such a way that dial 66 makes one revolution for each unit change in water level, for example, one foot, and since dial 67 rotates at one-tenth the speed of dial 66 and dial 68 at one-tenth the rate of dial 67, dials 67 and 68 make one-tenth and one-hundredth of a revolution respectively for each unit change. Each sector in dial 66 accordingly indicates tenths of a foot, or other unit, while each sector on dials 67 and 68 indicates feet and tens of feet respectively, and therefore the tones produced as described above with reference to the dial positions shown in Figure 7 represent a gage reading of 2.7 feet, or other unit of linear measurement, above datum.

An arrangement of this nature permits a maximum reading for the three dials of 99.9, which may be increased to 999.9 or still higher by adding another dial or series of dials. If a more refined reading is desired, on the other hand, the gear ratio between pulley 41 and dial 66 may be increased ten fold, thereby enabling readings to the nearest hundredth of a foot and a maximum reading of 99.99 feet to be obtained.

To avoid the occurrence of faulty or inaccurate contacts, such as are liable to take place as a result of slight play in the gears when roller 57 passes over one of the curvilinear dividing lines 70 between the sectors, the dials are caused to rotate in a slightly intermittent or jerky manner by employing a tripping mechanism below each dial which makes it suddenly turn past any critical sector dividing lines. A tripping mechanism adapted for this purpose will be described below in connection with shaft 45 and dial 66, although it is to be understood that each dial is provided with a similar device.

Fixed to shaft 45 at a point above plate 11 and immediately below dial 66 is a disc 78 which is cut away on one side 79 to form a cam and carries a pair of oppositely directed pistons 80 and 81 which reciprocate in cylinders 82 and 83. The outer ends of these cylinders are closed and constitute bearings for suitable springs 84 which serve to force pistons 80 and 81 toward a common point. Concentric with shaft 45 and fixed to top plate 11 by any suitable means is a circular plate 85 having ten teeth 86 in its periphery, leaving ten spacings 87 therebetween. Dial 66 is fixed to a yoked hub 88 revolably mounted on top of shaft 45, which hub carries a toggle 89 pivoted by two center screws 90 in such a manner that the toggle may rotate in a vertical plane. A thin vertical plate 91 is fastened to hub 88 on the side opposite the toggle.

When dial 66 and disc 78 are in normal position, as shown in Figure 10, plate 91 rests between the contiguous ends of pistons 80 and 81 and the downwardly projecting end of toggle 89 rests between two of the teeth 86 on plate 85. Then whenever shaft 45 is rotated by the float, dial 66 rotates therewith until toggle 89 is stopped by one of the fixed teeth 86, which produces a slight compression in one of the springs 84 and a turning torque on dial 66. As shaft 45 continues to rotate, cam disc 78 turns therewith and its edge soon encounters a cone-shaped roller 92 which is mounted on toggle 89 for rotation in a horizontal plane. This causes toggle 89 to be lifted over tooth 86 thereby releasing the torque and permitting dial 66 to make a sudden rotary movement. The toggle 89 thereupon rests in another space 87 between the teeth 86, and the operation is repeated as long as shaft 45 is rotated, so that the dial is given a jerky or intermittent rotary movement which prevents arm 15 from passing over one of the dividing lines 70 between the sectors on the dial.

In Figure 12 is shown a diagram of the circuits as well as the electrical and mechanical means for controlling the apparatus, so that by referring thereto an understanding of the operation of the entire system constituting the invention will be obtained. At 113 is one arrangement of central station equipment, which may be used with the system and apparatus constituting this invention. This equipment, which is used at a distant point from the measuring substation, comprises a transmitter 114 and a receiver 115 connected through condensers 116 to the conductors 95 of the control trunk to the substations. A key 117, which is normally held in the open position by means of the spring 118, is also provided at the central station for the purpose of connecting conductors 95 to ground and battery and thereby causing an energizing current to be sent over the conductors to the locking relay 17 at the substation. This current is equivalent to the ringing current ordinarily employed in telephone systems, but instead of ringing a bell in the present instance, it energizes relay 17.

The energization of relay 17 causes the arm 93 to swing about the pivot 94 against the pressure of a spring 96. Arm 93 is provided with a shoulder or projection 97 which normally serves to retain the spring pressed arm 98 and prevent it from moving about its pivot 99. When, however, arm 93 is moved by relay 17 against the pressure of spring 96 arm 98 is released from shoulder 97 and is pressed by the spring 98a (see Figure 13) to a position beneath or in line with said shoulder and thus serves to hold arm 93 in its new position until arm 98 is returned to its normal position again by means to be described. As arm 93 is swung about its pivot 94 in the manner described, it simultaneously releases an arm 100 fixed on shaft 36 which supports governor fan 37, thereby permitting shaft 36 as well as shaft 33 which supports arm 15 to revolve under the control of fan 37. Arm 15 is thus permitted to be rotated by motor 14 and the stud-roller 57 is caused to ride over the ridges 71 and 72 on the dials making a series of contacts and producing tones representing numerals or linear units as explained above.

On shaft 30, which rotates with shafts 33 and 36, is fixed a cam 38 carrying a pin 101 which upon completing one revolution, returns the locking arm 98 to its normal position, thereby permitting the bent end 102 of arm 93 to return to a position to encounter arm 100 under the pressure of spring 96 and thus stop fan 37 and arm 15. The continued motion of the fan after relay 17 is released carries pin 101 beyond the end 103 of locking arm 98 and thereby positions it for the next actuation of the apparatus. Cam 38 is also provided with a notch 104 for receiving the end of a contact spring 105 which presses continuously against the edge of the cam. Spring 105 normally rests in notch 104 but is brought into contact with a similar contact spring 106 during the rotation of cam 38, and this causes the closure of the circuit which transmits the signals over the telephone line or other similar means of communication.

The signaling system herein described is readily adaptable to all types of telephone systems from rural lines to city services having single party or multiple party lines, although Figure 12 merely illustrates the single party line generally used in city service.

In further explanation of the operation of the system shown in Figure 12, it should be understood that the system as shown comprises three separate circuits, which for convenience may be termed the relay or ringing circuit, the transmitting circuit, and the sound or signal producing circuit. As indicated above, the relay circuit includes the wires 107 and 107a and relay 17, while the transmitting circuit includes the wires 108 and 109 coming from the control trunk or communicating line 95, and the secondary of transformer 16.

The third or signal producing circuit, includes buzzer 13, contacts 62 and 63, the primary of transformer 16, as well as the condenser 110 and local battery 111. Thus when arm 52 closes contacts 62, 63 during its rotation about shaft 33, buzzer 11 is energized and this impresses a tone or series of tones onto the transmitting circuit through transformer 16. The tones last as long and are repeated as often as contacts 62 and 63 are brought together, and are interpreted at the other end of the communicating line in terms of the existing water level or the position of any other measuring device or actuating means.

The relay circuit is ordinarily closed but momentarily by the switch or key 117 at the central station, as arm 93 of relay 17 is locked in the release position by arm 98 until sufficient time has elapsed for the signals to be given. It is of course possible, however, to have these circuits associated in any other manner commonly employed in ordinary telephone systems or circuits. For example, the central station equipment may include means for automatically interrupting the relay or ringing circuit, as soon as the transmitting circuit is closed by cam 38 and contacts 105 and 106. Thus, under such circumstances, closing contacts 105 and 106 would perform the same function as lifting the receiver in an ordinary telephone system, that is, it leaves the line clear for communication.

The ratio of gears connecting shaft 30 with shaft 33 is such that shaft 33 makes two revolutions for each revolution of shaft 30, which causes the tone signals to be repeated before the sound circuit is broken, but of course the gear ratio may be varied to cause the tones to be repeated any desired number of times.

Several instruments may also be operated over the same line by using selective relays, in which case the system operates in the same manner as a "party" telephone line. Multiple gage lines are especially desirable in large systems, such as the water level system of the Mississippi river or other large watersheds, and in such instances, commercial telephones are installed in all gage houses, and an operator at a central station calls them periodically and in succession and thereby automatically receives the various water levels existing at any particular time throughout the entire system.

Although a telephone set may be employed at the measuring station, it is to be understood that such an arrangement is not necessary, as the measuring apparatus itself automatically produces signals which may be heard at the central control station. Also any alternating current may be impressed on the relay circuit to energize and lock the relay and start the apparatus in its measuring and signaling operation, as the ringing circuit of a telephone line is merely a convenient way of accomplishing this, and if desired, direct current may be employed for this purpose after eliminating the relay circuit condenser 112.

The apparatus has been described in connection with a sound producing device, but it is obvious that any other kind of signal producing mechanism may be utilized. For example, the system may include a variable illuminating device at the receiving end of the communicating line, or any suitable light indicating means, responsive to variations in electrical impulses produced at the measuring end of the line.

It is to be understood that the invention is not to be restricted to the exact structure shown and described herein, as variations of the apparatus and actuating and control circuits will occur to one skilled in the art upon obtaining an understanding of the invention. It is accordingly desired to obtain protection over all similar arrangements coming within the scope and spirit of the invention.

I claim:

1. In an apparatus for opening and closing an electric circuit, means for closing the circuit comprising a rotatable arm, a measuring device, and means connected to the measuring device and co-operating with the arm for varying the number of closures made by the arm in accordance with the variable position of the measuring device, said means comprising a plurality of rotatable plates each having a plurality of raised portions thereon for moving the arm to circuit closing position, the plane of rotation of said arm being parallel with and adjacent the planes of rotation of said plates and a portion of each plate being within the circumference described by said arm, whereby said arm may successively contact the surfaces of said plates during its rotation.

2. In a signaling system the combination of a communicating circuit, a relay circuit controlled by the communicating circuit, a signal producing circuit and a signal transmitting circuit, movable means released by the relay of said relay circuit for closing the signal transmitting circuit, a second movable means released by said relay, a measuring device, and a third movable means movable by said measuring means and cooperating with said second movable means to close the signal producing circuit a varying number of times according to the position of the measuring means, and means for impressing the signals produced in the signal producing circuit on the communicating circuit.

3. In a signaling system the combination of a communicating circuit, a relay circuit controlled by the communicating circuit, a signal producing circuit and a signal transmitting circuit, rotatable means released by the relay of said relay circuit for closing the signal transmitting circuit, a second rotatable means released by said relay, a measuring device, and a third rotatable means rotatable by said measuring means and cooperating with said second rotatable means to produce signal impulses varying in accordance with the position of the measuring means, and means for impressing the impulses thus produced on the communicating circuit.

4. In a signaling system the combination of a communicating circuit, a relay circuit, a signal producing circuit and a signal transmitting circuit, a motor and a measuring device, means for closing and opening said signal transmitting circuit releasable by the relay of said relay circuit and movable by said motor, and means for closing and opening said signal producing circuit comprising a plurality of movable members adapted to be moved into contact with each other, one of said members being releasable by said relay and movable by said motor and another of said members being movable by said measuring device, and means for impressing the signals thus produced on the communicating circuit.

5. In a signaling system the combination of a relay circuit, a signal producing circuit and a signal transmitting circuit, said last two circuits including the primary and secondary windings of a transformer respectively, a motor and a measuring device, means for closing and opening said signal transmitting circuit releasable by the relay of said relay circuit and movable by said motor, and means for closing and opening said signal producing circuit comprising a pair of movable members adapted to be moved into contact with each other, one of said members being releasable by said relay and movable by said motor and another of said members being movable by said measuring device.

6. In a signaling system, a signal producing circuit, means for making and breaking the circuit, a movable measuring device and means for varying the action of the making and breaking means in accordance with the variable position of the measuring device, said last named means comprising a movable plate connected with the measuring device and a movable arm operatively associated with the plate, said plate having a plurality of raised portions on a surface thereof and said arm having a second arm pivoted thereto and capable of contacting said raised portions during the movement of said first arm and movable by contact with said raised portions in a plane at right angles to the plane of movement of the first arm to a position to actuate said making and breaking means.

7. In a signaling system, a relay circuit, a signal producing circuit, means for making and breaking the signal producing circuit, a motor controlled by the relay of said relay circuit, a movable measuring device, and means for varying the action of the making and breaking means in accordance with the variable position of the measuring device, said last named means comprising a movable plate connected with the measuring device and a rotatable arm operated by the motor and operatively associated with the plate, said plate having a plurality of raised portions on a surface thereof and said arm having a second arm pivoted thereto and capable of contacting said raised portions during the movement of said first arm and movable by contact with said raised portions in a plane at right angles to the plane of movement of the first arm to a position to actuate said making and breaking means.

8. In a signaling system the combination of a relay circuit, a signal producing circuit, a motor controlled by the relay of said relay circuit, movable means releasable by the relay and movable by said motor, a second movable means pivotally mounted upon the first movable means and movable in a plane at right angles to the plane of movement of the first movable means, a measuring means, and a third movable means movable by said measuring means and cooperating with said first and second movable means to close the signal producing circuit a varying number of times, said third movable means comprising a dial provided with separate radially arranged areas on its surface, each of which has a varying number of raised portions thereon.

9. In a signaling system a communicating circuit, a relay circuit controlled by the communicating circuit, a signal producing circuit, means for making and breaking the signal producing circuit, a motor controlled by the relay of said relay circuit, a movable measuring device, means for varying the action of the making and breaking means in accordance with the variable position of the measuring device, said last named means comprising a rotatable plate connected with the measuring device and a rotatable arm operated by the motor and operatively associated with the plate, said plate having a plurality of raised portions on a surface thereof and said arm having a second arm pivoted thereto and capable of contacting said raised portions during the movement of said first arm and movable by contact with said raised portions in a plane at right angles to the plane of movement of the first arm to a position to actuate the making and breaking means, and means for automatically stopping said rotatable arm after a predetermined number of revolutions in a position to leave said signal producing circuit open.

10. In an apparatus for opening and closing an electric circuit, contact means for making and breaking the circuit, a movable measuring device, and means for varying the action of the making and breaking means in accordance with the variable position of the measuring device, said last named means comprising a movable plate connected with the measuring device and movable arm operatively associated with the plate, said plate being divided into a multiplicity of sectors having a varying number of raised portions on the surface thereof, and said arm having a second arm pivoted thereto and capable of contacting said raised portions during the movement of said first arm and movable by contact with said raised portions in a plane at right angles to the plane of movement of the first arm to a position to actuate said making and breaking means.

11. In an apparatus for opening and closing an electric circuit, a pair of contacts, a rotatable arm having a second arm pivoted thereto and operatively associated with said contacts, a projection on said second arm, a measuring device, means for moving said second arm in a plane at right angles to the plane of rotation of said first arm into position to close said contacts, said means being connected to the measuring device and comprising a rotatable plate having a surface divided into separate areas each of which is provided with a different number of raised portions which are movable into contacting relationship with the projection on said second arm during the rotation of said second arm about the axis of rotation of said first arm, and means for periodically imparting a jerky movement to the plate during its rotation to prevent contact of said projection with the critical lines of division of said areas during the rotation of said projection about said axis.

12. In an apparatus for opening and closing an electric circuit, a pair of spring contact members, a measuring device, a disk rotatable by the measuring device and divided into a multiplicity of sectors each having a varying number of raised portions thereon, a rotatable arm adjacent said disk and having pivotally mounted thereon a second arm which is operatively associated with said contact members and is repeatedly moved by said raised portions into position to close said contact members as said arms are rotated over said disk, and means for causing said contact members to close when said arms pass over one portion of said disk and for preventing said contact members from closing as said arms pass over another portion of said disk.

13. In a signaling system the combination of a communicating circuit, a relay circuit comprising a relay, a signal producing circuit and a signal transmitting circuit, a motor, means rotatable by said motor to close the signal transmitting circuit, a second rotatable means rotating with said first rotatable means, means for preventing said motor and said rotatable means from moving, said means being movable by said relay to a position permitting movement of said motor and said rotatable means, a measuring device, a third rotatable means rotatable by said measuring device and cooperating with said second rotatable means to close the signal producing circuit a varying number of times according to the position of the measuring means, and means for impressing the signals produced in the signal producing circuit on the communicating circuit.

14. In a signaling system the combination of a communicating circuit, a relay circuit comprising a relay, a signal producing circuit and a signal transmitting circuit, a motor, means rotatable by said motor to close the signal transmitting circuit, a second rotatable means rotating with said first rotatable means, means for preventing said motor and said rotatable means from moving, said means being movable by said relay to a position permitting movement of said motor and said rotatable means, means for retaining said motion preventing means in said last named position, means for moving said retaining means after a predetermined number of revolutions of said rotatable means to a position to permit said motion preventing means to return to its normal position, a measuring device, a third rotatable means rotatable by said measuring device and cooperating with said second rotatable means to close the signal producing circuit a varying number of times according to the position of the measuring means, and means for impressing the signals produced in the signal producing circuit on the communicating circuit.

JOHN C. STEVENS.